United States Patent Office.

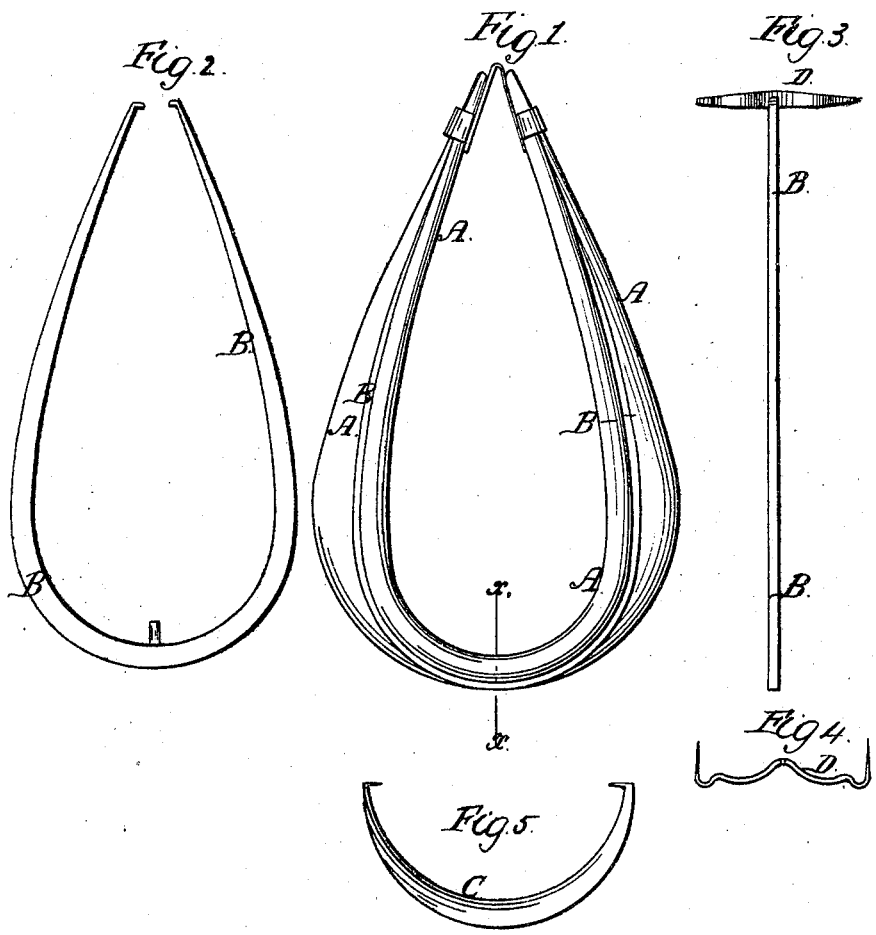

BENJAMIN J. BARTON AND ROSWELL J. STANLEY, OF WASHINGTON, IOWA.

Letters Patent No. 97,589, dated December 7, 1869.

IMPROVED SPRING FOR HORSE-COLLARS.

The Schedule referred to in these Letters Patent and making part of the same.

*To all whom it may concern:*

Be it known that we, BENJAMIN J. BARTON and ROSWELL J. STANLEY, of Washington, (Dutch Creek Post Office,) in the county of Washington, and State of Iowa, have invented a new and improved Spring for Horse-Collars; and we do hereby declare that the following is a full, clear, and exact description thereof, which will enable others skilled in the art to make and use the same, reference being had to the accompanying drawing, forming part of this specification, in which—

Figure 1 is a front view of my improved horse-collar, showing the spring attached.

Figure 2 is a front view of the spring, detached from the collar.

Figure 3 is an edge view of the same, showing a staple or fastening upon its end.

Figure 4 is an edge view of the staple.

Figure 5 is a side view of the lower staple.

Figure 6 is a detail cross-section, taken through the line x x, fig. 1.

My invention has for its object to furnish an improved spring for horse-collars, which shall be so constructed as to strengthen the collar and keep it in position and form, both when on and when off the horse, as hereinafter more fully described; and It consists in the construction of the spring and staples or fastenings, as hereinafter more fully described.

A is the collar, about the construction of which there is nothing new, except that it is made without straps or buckles.

B is the spring, which is made of some suitable metal, and of such a shape as to correspond with the shape of the collar A.

The spring B is made of about the form shown in fig. 2; that is to say, it is made wider and heavier at the lower part, where the collar is the weakest, and tapers gradually toward its upper end.

The upper ends of the spring B are turned inward, and formed into points or rivets, or have rivets attached to their ends, which enter or pass through the collar, to which they may be riveted, if desired.

In the lower part or bow of the spring B is formed a similar point or rivet, which may enter or pass through the collar, and may be riveted to said collar.

If desired, the lower part of the spring B may be secured to the collar by the staple C, with the middle part of which the middle part of the spring is connected, and the ends or points of which enter the collar, so as to secure the said spring in place.

The upper ends of the spring B may be connected with the collar A by the staple D, placed at right angles with the spring B, and the ends or points of which enter the collar A, so as to hold the said spring in place.

The staple D may also be used as a fastening, to keep the ends of the collar together, and in proper position upon the neck of the horse, for by passing the loops of the neck-pad over the staples D, the said pad will be held securely connected with the collar by the hames, when adjusted in place, thus forming a secure fastening, without straps or buckles.

Having thus described our invention,

What we claim as new, and desire to secure by Letters Patent, is—

1. The spring B, constructed as described, and secured around the collar in the manner herein shown and described, for the purpose specified.

2. The staple C, in combination with the spring B and collar A, substantially as herein shown and described, and for the purpose set forth.

3. The staple or staples D, in combination with the spring B and collar A, substantially as herein shown and described, and for the purpose set forth.

BENJAMIN J. BARTON.
ROSWELL J. STANLEY.

Witnesses:
W. N. STANLEY,
M. F. BARTON.